A. R. SCOTT.
ROAD SIGNAL.
APPLICATION FILED FEB. 23, 1916.
1,287,464. Patented Dec. 10, 1918.
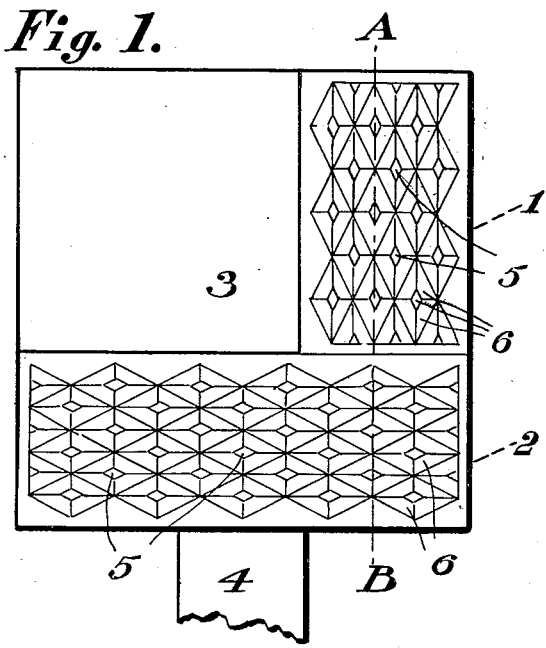
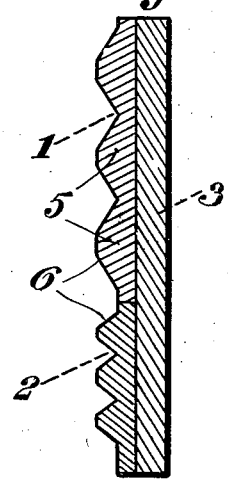
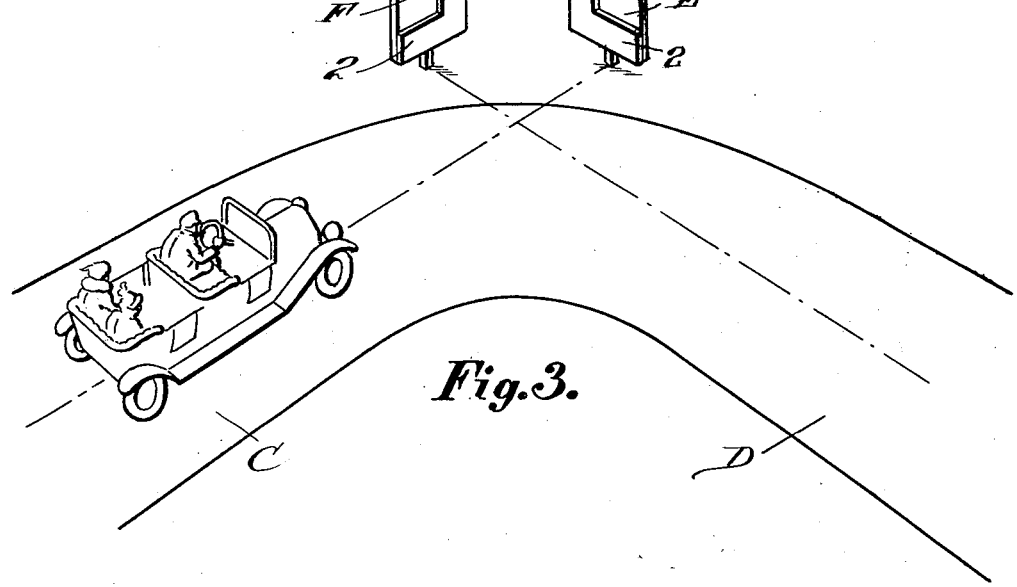
WITNESSES:
INVENTOR
Allan R. Scott
BY
ATTORNEY

UNITED STATES PATENT OFFICE.

ALLAN R. SCOTT, OF SPOKANE, WASHINGTON.

ROAD-SIGNAL.

1,287,464.    Specification of Letters Patent.    Patented Dec. 10, 1918.

Application filed February 23, 1916. Serial No. 79,992.

*To all whom it may concern:*

Be it known that I, ALLAN R. SCOTT, a citizen of the United States, and a resident of Spokane, in the county of Spokane and State of Washington, have invented a certain new and useful Improvement in Road-Signals, of which the following is a specification.

My invention is an improvement in that class of road signals consisting of light-reflectors arranged at an angle or curve of a roadway.

The details of construction, arrangement and operation of parts are as hereinafter described and illustrated in the accompanying drawing in which:

Figure 1 represents a face view of a signal board constructed according to my invention.

Fig. 2 represents a view in section taken therethrough on the plane indicated by the line A—B of Fig. 1.

Fig. 3 represents a view in perspective of signals arranged according to my invention.

Referring more particularly to the drawing, it will be seen that the signal includes essentially a base 3 made of wood or metal or other suitable material, on which is suitably secured a vertically arranged plate 1 having a reflecting surface, and a horizontally arranged plate 2, similarly provided with a reflecting surface. These plates 1 and 2 may be made of pressed glass having a silvered back, or they may be made of any other suitable material which will produce an efficient reflecting surface. The plates are provided each with a series of diamond-shaped sections 5 having a plurality of facets or faces 6 which will produce a sparkling or flashing effect when the lights of an approaching automobile fall upon the plates.

The signal may be mounted upon posts indicated at 4, or may be supported in any other suitable manner. As indicated in Fig. 3, a signal board is arranged at a point along the central line of each of the arms C and D of the roadway, and at a point beyond the curve, so that the lights from an automobile or other vehicle approaching along either of the arms of the roadway will be caught by one of the signal boards and cause an intense sparkling or flashing effect thereon so as to direct the attention of the driver of the vehicle to the fact that he is approaching a curve.

It will be noted that the plates 1 and 2 are arranged so as to indicate in which direction the curve lies. For instance, in Fig. 3 the driver of the automobile indicated as approaching along the arm C of the roadway, upon seeing the signal board indicated E, will understand that the horizontal plate or arm 2, standing at right angles to the vertical arm 1, and lying on the right hand side of it, will indicate that the curve in the roadway lies toward the right. Similarly the driver of an automobile approaching the curve along the arm D of the roadway, in observing the signal F, will note that the lower horizontal arm 2 in pointing to the left, indicates that the curve ahead lies to his left.

I claim:—

1. A road signal consisting of a pair of light receiving plates mounted adjacent a road bend at the outside thereof, each plate disposed in a plane perpendicular to a plane coincident with the median line of each arm of the bend, and means carried by each plate to indicate to a driver on one branch of the bend the direction of the other branch.

2. A road signal consisting of a pair of vertically disposed light receiving members located adjacent and beyond a road bend or crossing at each side of the apex of said bend and perpendicular to the median line of each arm of the bend, each member carrying L-shaped light flashing elements the free end of the horizontal arm of such light flashing element seen by a driver on one branch of the bend indicating the direction of the other branch of the bend.

3. A road signal consisting of a plurality of plates mounted adjacent a roadway in position to fall within the rays of light from an approaching vehicle, and having faceted reflecting surfaces for causing a sparkling effect for warning the driver of such vehicle of the approach to a bend or curve, the plates being so disposed to indicate to that driver the direction of the other arm of the bend.

4. A road signal consisting of light reflecting plates located adjacent and exteriorly of the apex of a bend in a roadway, said plates having a vertical and a horizontal member juxtaposed in right angular relation, and placed at right angles to the center line of the arms of the roadway bend, as shown and described.

ALLAN R. SCOTT.

Witnesses:
  HENRY M. MOSS,
  W. T. ANDRE.